United States Patent [19]
Ito

[11] Patent Number: 6,033,466
[45] Date of Patent: Mar. 7, 2000

[54] PIGMENT AND PIGMENT INK BY APPLYING THE PIGMENT

[75] Inventor: Kengo Ito, Miyagi, Japan

[73] Assignee: Sony Corporation, Tokyo, Japan

[21] Appl. No.: 08/905,402

[22] Filed: Aug. 4, 1997

[30] Foreign Application Priority Data

Aug. 5, 1996 [JP] Japan .................................. P08-205837

[51] Int. Cl.$^7$ .............................. C09C 1/42; C09D 11/02
[52] U.S. Cl. ........................... 106/486; 106/416; 106/487; 106/468; 106/31.6; 106/31.85; 106/31.86
[58] Field of Search .................................... 106/416, 486, 106/487, 468, 31.6, 31.85, 31.86

[56] References Cited

U.S. PATENT DOCUMENTS

| | | | |
|---|---|---|---|
| 5,160,371 | 11/1992 | Ito ............................................. | 106/487 |
| 5,296,284 | 3/1994 | Durham .................................... | 106/416 |
| 5,308,808 | 5/1994 | Gregar et al. ............................ | 106/486 |
| 5,446,012 | 8/1995 | Ito et al. ................................... | 428/195 |
| 5,459,502 | 10/1995 | Sasaki et al. ............................ | 347/100 |
| 5,516,746 | 5/1996 | Ito ............................................. | 428/195 |
| 5,543,453 | 8/1996 | Ito et al. ................................... | 106/487 |
| 5,560,996 | 10/1996 | Ito et al. ................................... | 428/500 |
| 5,589,435 | 12/1996 | Ito et al. ................................... | 428/195 |

FOREIGN PATENT DOCUMENTS

633143 A1  1/1995  European Pat. Off. .

*Primary Examiner*—Michael Marcheschi
*Attorney, Agent, or Firm*—Hill & Simpson

[57] ABSTRACT

The present invention provides a pigment ink which can be produced through a simplified procedure and enables coloring as good as a dye ink. The pigment ink mainly consists of an intercalation compound such as a mineral of the montmorrilonite group and the hydrotalcite group, wherein at least a part of interstitial ions in the intercalation compound is substituted by dye ions having a polarity opposite to that of the interstitial ions. The pigment is dispersed in water together with a dispersion agent and a wetting agent so as to obtain the pigment ink. Remaining interstitial ions not substituted by the dye ions are substituted by hydrophilic ions.

8 Claims, No Drawings

PIGMENT AND PIGMENT INK BY APPLYING THE PIGMENT

BACKGROUND OF THE INVENTION

1. Field of the Invention

This invention relates to a pigment to be contained in the ink used for forming an image by ink jet printing methods and to an ink containing the pigment.

2. Prior Art

Nowadays, with the increased use of personal computers, the ability to print the images produced by means of such personal computer on recording papers with an image quality approaching that of silver halide photography is desired. With ink jet printing methods a solution type ink is ejected from nozzle by driving the ink with an electric field, heat, pressure or other driving means.

In aforementioned ink jet printing system, an aqueous solution is used as ink, and, as the recording paper, a recording paper having a dye receiving layer disposed on a supporting layer is generally used.

As coloring material for aforementioned aqueous ink, for printing use and for photograph use, to be used as office automation equipment of in door use, in view of convenience and to prevent clogging and equipment maintenance or for the realization of high quality images, water soluble dyes are normally used. On the other hand, for printing out door displays such as posters, sign boards, and for printing industry use such as corrugated cardboard and others, pigments durable for maintaining figures are normally used. Hereinafter, the aqueous ink containing pigment as coloring material is called pigment ink and the aqueous ink containing pigment as coloring material is called hereinafter pigment ink.

As the pigment used in pigment ink, the organic pigments having specific molecular structure represented by phthalocyanine and the like and quinacridine and the like are, as a trend, used more frequently than the inorganic pigments, which present safety problems.

However, such organic pigments are expensive, and the number of suitable types of organic pigments useful for printing full color images is limited. The ability to obtain free color tone, depends on the particle size, however, if the refractive index of molecular group forming pigment is too large, light scattering increasingly occurs when the pigments are printed on plain paper. As the result, the saturation of the image decreases, because of the adverse influence of multiple inside reflection. Moreover, as a general matter, the organic pigments exhibit a tendency of lowering the molecular light absorption coefficient by mutual mixing. As a result, the organic pigments generally have lower tinctorial power, compared to dyes, by the same amount of the addition. When the tinctorial power and saturation become lower, then the clearness of image deteriorates.

Also, for bringing pigment ink into practical use, in view of preventing the clogging at the nozzle point, the applied particle size of the applied pigment becomes also finer to secure the long range excellent dispersion stability.

For this reason, as disclosed in U.S. Pat. No. 4,533,254, the proposal on the manufacturing device to lower the pigment particle size to a colloidal level, or as disclosed in U.S. Pat. No. 4,597,794 and U.S. Pat. No. 5,229,746, resin type disperse agent to secure high dispersion stability is presented.

However, even by applying these technologies to solve dispersion stability problems, the problems of cost and color tone still remains.

In view of aforementioned circumstance, the purpose of this invention is to provide the pigment with color tone competitive to aqueous ink containing dye, to provide a more simple manufacturing process and to propose a low cost pigment ink. Also, the purpose of this invention is to provide with a pigment ink by applying aforementioned pigment.

The pigment according to this invention is considered to attain aforementioned purpose and is mainly made up of intercalation compound and wherein at least a part of the intercalation ion in said intercalation compound is replaced by intercalation ions. That is to say, this invention utilizes the possibility of dye stable fixing by intercalation reaction based upon the ion exchange of intercalation compound and to apply it to pigment area.

That is, the present invention utilizes as a pigment an intercalation compound capable fixing and holding a dye by intercalation reaction based on ion replacement.

Here, as intercalation compound, montmorillonite ore group provided with smectic structure or hydrotalcite group ore are preferable. A part of intercalation ions are replaced by dye ions, and when possible, any remaining intercalation ions not previously ion exchanged with dye ions are preferably replaced by hydrophilic ions. Anyway, the amount of the replacement by dye ions should be, preferably, at least more than 5% of the exchange capacity possessed by the intercalation compound. When the amount of the replacement by dye ion is lower than this rate, the tinting strength becomes insufficient and the clearness of the image formed by using this pigment is decreased. However, if there may remain any unabsorbed ions, the dispersion of the pigment in water becomes tremendously deteriorated. Therefore, to obtain submicron particle size, though it depends upon dye sort, it is preferable to secure the amount of absorption lower than 50% of exchange capacity.

In case of the intercalation compound of montmorillonite group ore, the dye ions which replace at least a part of the intercalation ions are either a basic direct dye or a cation dye. So, it is preferable, that any remaining non-dye substituted hydrophobic intercalation ions be replaced at least in part by hydrogen ions.

When a basic direct dye and a cation dye are, together with ions, absorbed into monmorillonite group ore layer, it is possible to increase the light resistance. This is because, that the basic direct dye and cation dye have a nature of increasing light resistance under hydrogen atmosphere. For this reason, among the intercalation ions of monmorillonite group ores, those, which, because of stereospecificity, are not be replaced with aforementioned dye, are preferably replaced by hydrogen ions.

When the intercalation ions are replaced by absorption of other ions into aforementioned layers, then the dispersibility in water becomes controllable.

On the other hand, when the intercalation compounds are composed of hydrotalcite group ore, the hydrotalcite group ores are preferably the baking of natural clay indicated by the composition formula $Mg0.7Al0.3O1.16$.

When the intercalation compound is made up of hydrotalcite group ore, it is preferable that the dye ions replace at least a part of the intercalation ions and any remaining intercalation ions be replaced by hydrophilic ions, preferably such as the anion of salicylic acid, or an isomer the anion of salicylic acid or the anion of salicylic acid derivative having pKa value less than 5.0.

When an anionic dye, such as a direct dye or an acid dye is absorbed, together with hydrophilic ions such as salicylic acid anion or the anion of a salicylic acid isomer or the anion of salicylic acid derivative, into the interlayer of hydrotalcite group ore, the light resistance can be increased. Especially, when aforementioned hydrophilic ions are previously absorbed, the amount of the absorption of anion dye is tremendously increased, thereby also increasing light resistance.

Also, when the intercalation ions of hydrotalcite group ore are replaced by aforementioned anion dye and hydrophilic ions sufficiently to prevent the absorption of other ions into the intercalation, control of an appropriate level of dispersibility in water is provided.

The pigments of aforementioned composition are preferably applicable as pigment ink.

That is to say, the pigment ink according to this invention is made up mainly of intercalation compound. And, at least, a part of the intercalation ions are replaced by specific dye ion showing a reverse polarity as of regarding intercalation ions to produce a pigment to be dispersed, together with dispersant and humectant, in water. As for the pigment in said pigment ink is already aforementioned, but as to the dispersant and humectant to be applied with said pigment are as follows.

In case of the intercalation compound made up of montmorillonite group ores, it is preferable to use pyrophosphoric acid or the salt in an amount of from about 20 up to 100% by weight, based upon the weight of the dye-substituted montmorillonite intercalation compound pigment as a dispersant. When the particle of said intercalation compound is atomized, the viscosity of the pigment ink tends to increase. But in such case, when pyrophosphoric acid or the salt thereof is added as a dispersant, the viscosity is decreased by its breakup effect. When the amount of pyrophosphoric acid or the salt thereof is less then 10 percent weight, then the effect is not obtained. When the amount of them is more than 100 percent weight, then the limit of the solubility is exceeded.

When said intercalation compound is made up of hydrotalcite group ores, it is preferable that polyacrylic acid or the salt thereof is used as dispersant by the addition of 100 up to 1000 percent weight ratio. As to the intercalation compound made up of hydrotalcite, when the excessive amount of the same ions as of the dye absorption ion polarity may be added, a repulsive force caused by surface electric charge on the intercalation compound in conjugated condition may brought about to prevent the coagulation of the intercalation compound particles. For this reason, when aforementioned compound may be added as dispersant, the dispersibility of intercalation compound may be stabilized. Moreover, when the amount of addition of polyacrylic acid or the salt thereof is less than 100 percent weight, it is possible to obtain sufficient effect. On the other hand, when the amount of polyacrylic acid or acid salt added exceeds 1000 percent, the image formed by such pigment is liable to be disrupted as the result of the lowered water resistance of such formed picture image.

As humectant, it is preferable to use both of a heterocyclic ketone and either glycerine or a glycerine derivative, among which heterocyclic ketone, glycerine and glycerine derivatives have hygroscopicity. The heterocyclic ketone has a solubility on dyestuff, which is absorbed into the intercalation of the intercalation compounds. Glycerine or glycerine derivatives shows no solubility for dyestuffs. For this reason, when heterocyclic ketone only is applied as humectant, ketone absorbs dye as humectant and swells. Also, when glycerine and/or glycerine derivative only is used as humectant, then the capability of discharge deteriorates and blurring of drawn images and finally even clogging of nozzle takes place. For this reason, heterocyclic ketone and glycerine or glycerine derivatives should be applied in combination, under more appropriate index of addition required.

OBJECT AND SUMMARY OF THE INVENTION

Hereinafter, embodiments of this invention will be explained with reference to actual examples hereinafter. The pigment according to this invention comprises a dye ion substituted intercalation compound in which at least a part of the intercalation sites in the intercalation compound are replaced by specific dye ions having a polarity opposite that of the original, unsubstituted intercalation ions.

According to this invention, a new and improved pigment comprises an intercalation compound ion substituted with ions of a dye material by an intercalation reaction based upon ion exchange. At least a part of the intercalation sites in the starting intercalation compound are replaced by the specific dye ions having reverse polarity as of related intercalation ions.

In this invention, the intercalation compound has a layered structure and the layered inorganic macromolecule compound is provided with exchangeable ions capable of ion exchange with ions of a water soluble dye in a hydrophilic intercalation.

The exchangeable ion of the layered inorganic macromolecule is an exchangeable cation such as a sodium ion and the like. In case of the water soluble cationic dye as water soluble dye, the exchangeable anion such as carboxyl anion is applied.

As one of intercalation inorganic macromolecule having exchangeable cation (hereinafter referred to as cation exchangeable intercalation compound), it is possible preferably to refer natural or synthetic intercalation silicate or burned product thereof. As representative example thereof, there is montmorillonite group ore with 3-octagonal smetic structure. The montmorillonite group ore is shown by composition formula (1).

Composition Formula 1

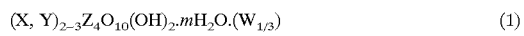

$$(X, Y)_{2-3}Z_4O_{10}(OH)_2 \cdot mH_2O \cdot (W_{1/3}) \tag{1}$$

(wherein X denotes Al, Fe(III), Mn(III), or Co(III) Y denotes Mg, Fe(II), Ni, Zn or Li, Z denotes Si or Ca, W denotes K, Na or Ca. $H_2O$ is the intercalation water and m denotes an integer.)

As a concrete example, according to the combination of X and Y and the number of replacement, it is possible to refer to natural or synthetic montmorillonite, iron-montmorillonite, iron-magnecian-montmorillonite, beidellite, arminian baidellite, nontronite, arminian nontronite, saponite, arminian saponite, hectorite, sauconite and others. Moreover, the hydroxyl group of aforementioned composition formula I can be replaced by fluorine and the replaced compounds can be applied in this invention.

Also, other than montmorillonite group ores, the mica group ores such as sodium silicate, mica, sodium tenorite, lithium tenorite, are applicable as cation exchangeable intercalation compounds. Moreover, synthetic clay ores, may be used as cation exchangeable intercalation compound, the acid salt such as zyrconium phosphate and others and layered hydrate hydroxide titanium are, in this invention, also applicable. These compounds have a nature of optically hiding characteristics or specific colors. Then these are applicable except in the case, where transparency, glossiness, whiteness are not simultaneously required.

Also, as synthetic silica salt showing a strong affinity with cation dye, there is amorphous synthetic silica and others. However, aforementioned materials are, compared to montmorillonite group ores, insufficient in dye fixing capability, that is to say, in ion exchange capability. However, these compounds are applicable when there required no high ion exchange capability.

When, as cation exchange intercalation compound, there applied fine powder of synthetic silica salt without any impurity, as the fine crystal powder is optically transparent, it is possible to provide with a pigment enabling to realize a high saturation competitive to silver halide photography.

The exchangeable cations in the intercalation of aforementioned cation exchangeable intercalation compounds can be replaced by organic cation realizing an effect (Pillar effect) of changing the intercalation partially into hydrophobic state. As such organic cations, there are quaternary ammonium ion, phosphonium ion, alkyl phosphonium ion, aryl phosphonium ion and others. Preferred quaternary ammonium compounds include at least one substituent having more than 4 preferably more than 8 carbon atoms. When the number of carbons in the chain alkyl is small, the Pillar effect becomes insufficient. Then it becomes impossible to secure the intercalation as fixed seat (exchangeable inorganic cation).

On the other hand, as intercalation inorganic macromolecule with exchangeable anion (hereinafter referred to as anion exchangeable intercalation compound), the adoption of layered hydrotalcite group ores, which are a kind of 0:1 type clay ores and made up of $AlO_6$ octahedral seat, is preferable. As the representative one of such hydrotalcite group ore is, as shown in composition formula 2, natural hydrotalcite Composition Formula 2

$$Mg_6Al_2(OH)_{16}\cdot CO_3\cdot 4H_2O \qquad (2)$$

In this invention, especially, the adoption of the burned product of hydrotalcite by composition formula $Mg_{0.7}Al_{0.3}O_{1.16}$ is preferable.

Though there is some deviation from the composition of natural hydrotalcite shown in composition formula 2, synthetic hydrotalcite is commercially available. The fine powder of such synthetic hydrotalcite does not contain any impurity and is pure white in color. However, because the crystal is optically transparent, then, when such a fine powder is applied, a pigment of saturation competitive to silver halide photography is obtained.

Other than aforementioned hydrotalcite group ores, as the anion exchangeable intercalation compounds, the hydrated oxides of titanium, zirconium, lanthanum, bismuth or phosphate hydroxide are available for this invention. These compounds are optically hiding or have specific color and can be used when transparency, glossiness and whiteness are not required.

The aforementioned exchangeable anions existing in the intercalation of anion exchangeable intercalation compound can be replaced by organic anion, which has an effect of extending intercalation layer distance (Piller effect) and an effect of making the intercalation partially hydrophobic. Illustrative organic anions may include acid anion, ester anion, phosphoric ester anion and others. Normally, such an anion has alkyl group. In such case, when the number of carbons is small, the aforementioned Pillar effect becomes insufficient and difficulty on securing the intercalation as fixed seat (exchangeable inorganic ions) arises. When the number of carbons is too large, there happens the difficulty for replacement. As a result, the number of carbons should be preferably 5 up to 20.

The intercalation compounds for use herein are those capable of securing dye fixing by intercalation reaction based upon ion exchange. When cation exchange intercalation compounds such as montmorillonite group ores are used, or when anion exchange intercalation compounds such as an hydrotalcite group ores are used, in either case, at least a part or, when possible, all of the intercalation ions are replaced by dye ions and any remaining intercalation ions not replaced by dye ions are preferably replaced by hydrophilic ions. Also, in either case, the amount of dye ion substitution is preferably more than 5 percent of the ion exchange capacity possessed by the intercalation compounds. When the amount of dye ion substitution is lower than this rate, the tinting strength becomes insufficient and the clearness of the image formed by using this pigment is decreased. However, if there remain any unabsorbed ions, the dispersion of the pigment in water becomes tremendously deteriorated. Therefore, to obtain submicron particle size, though it depends upon dye sort, it is preferable to provide a dye ion substitution or absorption lower than 50% of the ion exchange capacity of the starting intercalation compound.

In case of the intercalation compound of montmorillonite group ore, the dye ion inserted into and substituting for at least a part of the intercalation ions is a basic dye ion or, especially, either a cationic dye or a basic direct dye. Preferably, any remaining unsubstituted hydrophobic ions should be replaced at least in part by hydrogen ions.

Here, as cation dye, azo dye with amine salt or No. 4 class ammonium radical, triphenylmethane dye, azine dye, oxazine dye, and thiazine dye are applicable: as a yellow dye, C. I. basic yellow 1, 2, 11, 13, 14, 19, 21, 25, 28, 32, 33, 35 or 36 class; as magenta dye, C. I. basic 1 dye 1, 2, 9, 12, 13, 14, 15, 17, 18, 19, 22, 23, 24, 27, 29, 32, 38, 39, 40, and C. I. basic voilette 7, 10, 15, 21, 25, 26, 27 or 28; as a cyan dye, C. I. basic blue 1, 3, 5, 7, 9, 19, 21, 22, 24, 25, 26, 28, 29, 40, 41, 44, 45, 47, 54, 58, 59, 60, 64, 65, 66, 67, 68 or 75; as a black dye, C. I. basic black 2 or 8. Especially preferable dyes are: C. I. basic yellow 21, 36, 67, 73, and those represented by Chemical Formulae 3, 4, 5, 6, 7, 8, 9, and 10.

Chemical Formula 3

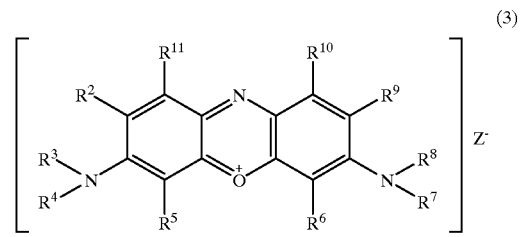

(wherein, $R^1, R^2, R^3, R^4, R^5, R^6, R^7, R^8, R^9$, and $R^{10}$ denote, independently, hydrogen and halogen atoms, cyano, alkyl, cycloalkyl, alkoxy, aryl, aryloxy, aralkyl, aralkoxy, alkenyl, alkenoxy, alkoxycarbonyl, acyloxy or acyl radicals.

These may be replaced. Moreover, $R^1$ and $R^2$, $R^3$ and $R^4$, $R^7$ and $R^8$, and $R^9$ and $R^{10}$ may be respectively coupled with each other so as to create a ring. $Z^-$ represents a pair ion.)

Chemical Formula 4

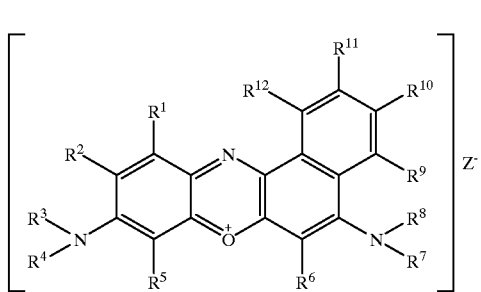

(4)

(wherein, $R^1$, $R^2$, $R^3$, $R^4$, $R^5$, $R^6$, $R^7$, $R^8$, $R^9$, $R^{10}$, $R^{11}$, and $R^{12}$ denote, independently, hydrogen and halogen atoms, cyano, alkyl, cycloalkyl, alkoxy, aryl, aryloxy, aralkyl, aralkoxy, alkenyl, alkenoxy, alkoxycarbonyl, acyloxy or acyl radicals. These may be replaced. Moreover, $R^1$ and $R^2$, $R^3$ and $R^4$, $R^7$ and $R^8$, and $R^9$ and $R^{10}$, $R^{10}$ and $R^{11}$, and $R^{11}$ and $R^{12}$, may be respectively coupled with each other so as to create a cycle. $Z^-$ represents a pair ion.)

Chemical Formula 5

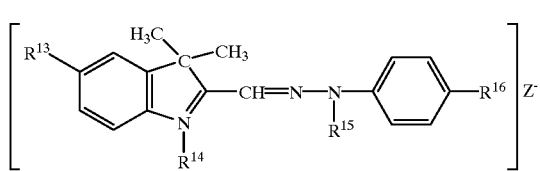

(5)

(wherein, $R^{13}$, $R^{14}$, $R^{15}$, and $R^{16}$ denote, independently, hydrogen and halogen atoms, cyano, alkyl, cycloalkyl, alcoxy, aryl, aryloxy, aralkyl, aralkoxy, alkenyl, alkenoxy, alkoxycarbonyl, acyloxy or acyl radicals. These may be replaced. $Z^-$ represents a pair ion.)

Chemical Formula 6

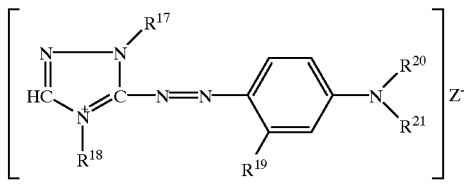

(6)

(wherein, $R^{17}$, $R^{18}$, $R^{19}$, $R^{20}$, and $R^{21}$ denote, independently, hydrogen and halogen atoms, cyano, alkyl, cycloalkyl, alcoxy, aryl, aryloxy, aralkyl, aralkoxy, alkenyl, alkenoxy, alkoxycarbonyl, acyloxy or acyl radicals. These may be replaced. $R^{20}$ and $R^{21}$ may be coupled with each other. $Z^-$ represents a pair ion.)

Chemical Formula 7

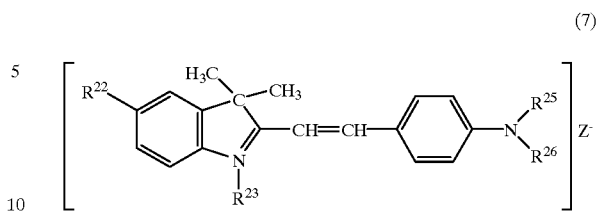

(7)

(wherein, $R^{22}$, $R^{23}$, $R^{24}$, $R^{25}$, and $R^{26}$ denote, independently, hydrogen and halogen atoms, cyano, alkyl, cycloalkyl, alkoxy, aryl, aryloxy, aralkyl, aralkoxy, alkenyl, alkenoxy, alkoxycarbonyl, acyloxy or acyl radicals. These may be replaced. $R^{25}$ and $R^{26}$ may be coupled with each other. $Z^-$ represents a pair ion.)

Chemical Formula 8

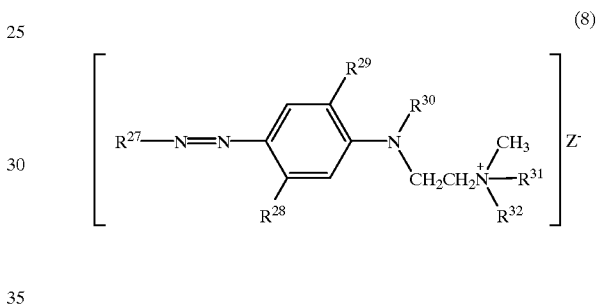

(8)

(wherein, $R^{27}$ is a substituted or unsubstituted aryl radical, or substituted or unsubstituted heterocycle; $R^{28}$ and $R^{29}$ denote, independently, hydrogen and halogen atoms, cyano, alkyl, cycloalkyl, alkoxy, aryl, aryloxy, aralkyl, aralkoxy, alkenyl, alkenoxy, alkoxycarbonyl, acyloxy, acyl, or acylamino radicals. These may be replaced. $R^{30}$ is a substituted or unsubstituted alkyl radical; $R^{31}$ and $R^{32}$ are independently hydrogen atom, substituted or unsubstituted alkyl radical; or substituted or unsubstituted aralkyl radical; or $R^{31}$ and $R^{32}$ may be coupled with each other. $Z^-$ represents a pair ion.)

Chemical Formula 9

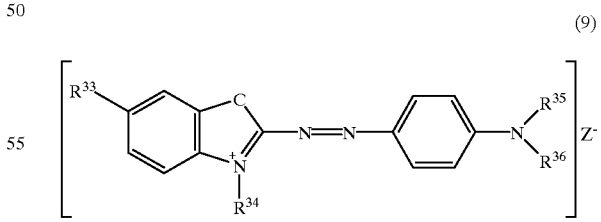

(9)

(wherein, $R^{33}$, $R^{34}$, $R^{35}$, and $R^{36}$ denote, independently, hydrogen and halogen atoms, cyano, alkyl, cycloalkyl, alkoxy, aryl, aryloxy, aralkyl, aralkoxy, alkenyl, alkenoxy, alkoxycarbonyl, acyloxy or acyl radicals. These may be replaced. $R^{35}$ and $R^{36}$ may be coupled with each other. $Z^-$ represents a pair ion.)

Chemical Formula 10

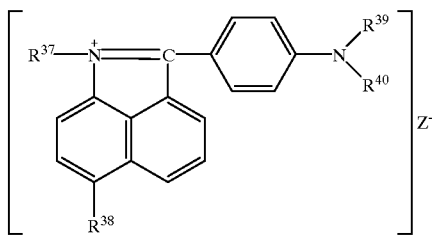

(wherein, $R^{37}$, $R^{38}$, $R^{39}$, and $R^{40}$ denote, independently, hydrogen and halogen atoms, cyano, alkyl, cycloalkyl, alkoxy, aryl, aryloxy, aralkyl, aralkoxy, alkenyl, alkenoxy, alkoxycarbonyl, acyloxy or acyl radicals. These may be replaced. $R^{39}$ and $R^{40}$ may be coupled with each other. $Z^-$ represents a pair ion.)

These cation dyes normally have inorganic anions as pair ions, most of which exist as salts of a strong acid. Consequently; its aqueous solution is generally an acid, and it is preferable to neutralize the solution with a basic salt so as to prevent corrosion of a metal member which is brought into contact with the ink compositions. For example, it is preferable that inorganic anions as pair ion be treated by organic anion soda such as carboxylic ions so as to replace the inorganic ions with organic anions. In this case, it is preferable not to reduce the affinity with intercalation compound due to salt with organic anions in order not to reduce the affinity with respect to the cation dye which is an intercalation compound.

Moreover, there are basic direct dyes such as PERGASOL F (trade name) produced by Ciba Geigy, CARTASOL K (trade name) produced by Sandoz Co., Ltd., LEVACELL C (trade name) produced by Bayer Co., Ltd., FASTUSOL C (trade name) produced by BASF Co., Ltd., and others.

Furthermore, in order to replace remaining interstitial ions not substitued by the dye ions with hydrogen ions, for example, a cation-replacing layered compound such as a montmorrillonite group ore can be put into a liquid containing hydrochloric acid.

The aforementioned basic dyes such as a basic direct dye and cation dye can improve its light resistance if adsorbed between layers of the montmorrillonite group ore together with hydrogen ions. This is because a basic dye such as the basic direct dye and the cationic dye improves its light resistance in an acidic environment. Consequently, it is preferable that those interstitial ions in the montmorrilonite group ore which are not substituted by the aforementioned dye due to three-dimensional failure such as steric hinderance, be substitued by hydrogen ions as much as possible.

If the interstitial ions of the montmorrillonite group ore are sufficiently replaced by the aforementioned dye and hydrogen ions so that other ions cannot be adsorbed between layers, this will help to control dispersability into water when made into an ink.

On the other hand, in the case when the intercalation compound is a mineral of the hydrotalcite group, it is preferable that the dye ions be substituted for at least a part of the original interstitial ions be an anionic dye, i.e., one of a direct dye and an acidic dye, and any remaining interstitial ions not substituted with dye ions be substituted in turn with anions of salicylic acid or anions of a salilcylic acid derivative which has a pKa value of 5.0 or below.

It is possible to use anionic dyes which have, as a chromophore, a monoazo group, diazo group, anthraquinone skeleton triphenylmethane skeleton, or the like and furthermore, within a molecule, one to three sulfonic groups or carboxyl groups, i.e., water-soluble anionic groups. Such anionic dyes may be: a yellow direct dye such as C. I. Direct Yellow 1, 8, 11, 12, 24, 26, 27, 28, 33, 39, 44, 50, 58, 85, 86, 87, 88, 89, 98, 100, and 110; a magenta direct dye such as C. I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 321; a cyan direct dye such as C. I. Direct Blue 1, 2, 6, 8, 15, 22, 25, 41, 71, 76, 77, 78, 80, 86, 90, 98, 106, 108, 120, 158, 160, 163, 165, 168, 192, 193, 194, 195, 196, 199, 200, 201, 202, 203, 207, 225, 226, 236, 237, 246, 248, and 249; a black direct dye such as C. I. Direct Black 17, 19, 22, 32, 38, 51, 56, 62, 71, 74, 75, 77, 94, 105, 106, 107, 108, 112, 113, 117, 118, 132, 133, and 146.

Moreover, an acid dye may be: a yellow acid dye such as C. I. Acid Yellow 1, 3, 7, 11, 17, 19, 23, 25, 29, 36, 38, 40, 42, 44, 49, 59, 61, 70, 72, 75, 76, 78, 79, 98, 99, 110, 111, 112, 114, 116, 118, 119, 127, 128, 131, 135, 141, 142, 161, 162, 163, 164, and 165; a magenta acid dye such as C. I. Acid Red 1, 6, 8, 9, 13, 14, 18, 26, 27, 32, 35, 37, 42, 51, 552, 57, 75, 77, 80, 82, 83, 85, 87, 88, 89, 92, 94, 97, 106, 111, 114, 115, 117, 118, 119, 129, 130, 131, 133, 134, 138, 143, 145, 154, 155, 158, 168, 180, 183, 184, 185, 186, 194, 198, 199, 209, 211, 215, 216, 217, 219, 249, 252, 254, 256, 257, 262, 265, 266, 274, 276, 282, 283, 303, 317, 318, 320, 321, and 322; a cyan acid dye such as C. I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 175, 182, 183, 184, 187, 192, 199, 203, 204, 205, 229, 234, and 236; and a black acid dye such as C. I. Acid black 1, 2, 7, 24, 26, 29, 31, 44, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 191, and others.

These anionic dyes can be held directly between layers, but it is also possible that a part of the intercalatable ion exchange sites are substituted with organic cations such as onium ions so as to improve solubility with alcohols used as an auxiliary component of an ink to prevent blotting. In such a case, in order not to reduce the affinity of the intercalation compound with respect to the anionic dye, it is preferable not to make the dye highly hydrophobic by making salt with organic cations.

Moreover, in order to substitute the remaining interstitial ions which have not been replaced by the aforementioned dye ions, with anions of salicylic acid or anions of its isomer or anions of a salicylic acid derivative which has a pKa value of 5.0 or below, for example, an anion-substituted layered compound such as the hydrotalcite group ore is swollen in water and the salicylic acid or the like is added to the solution in an amount equivalent to the substitution or replacement capacity of the intercalation compound until equilibrium is reached.

If an anion dye such as a direct dye and an acid dye is adsorbed betwen layers of the hydrotalcite group or together with salicylic acid anions or anions of its isomer or anions of salicylic acid derivative which has pKa value of 5.0 or below; then, the dye adsorption amount is remarkably increased and the light resistance is also significantly improved.

Moreover if the interstitial ions of the hydrotalcite group ore are sufficiently replaced by the aforementioned anion dyes and aromatic acid so that other ions will not be adsorbed between layers, then the resultant ink can properly control its dispersability in water.

A pigment having the above-described configuration is preferable for use as a pigment ink. That is, the pigment ink according to the present invention is formed from a pigment mainly consiting of an intercalation compound wherein at least a part of interstitial ions is replaced by particular dye ions having a polarity opposite to the interstitial ions, the pigment being dispersed in water together with a dispersion agent and a humectant.

In the case when the intercalation compound is a mineral of montmorrillonite group, it is preferable to prepare a pigment ink by using pyrophosphoric acid or its salt as a dispersion agent in an amount of 20 to 100% by weight with respect to the pigment. As the particles of the intercalation compound become smaller, the viscosity of the pigment ink becomes higher due to swelling of the intercalation compound. However, if pyrophosphoric acid or its salt is added, its breakup effect can decrease the viscosity. It should be noted that no practical breakup effect can be obtained if the amount of pyrophosphoric acid or its salt to be added is 20% by weight or below, whereas the dissolving limit is exceeded if the amount to be added exceeds 100% by weight.

Moreover, when the intercalation comound is a mineral of hydrotalcite group, it is preferable to use polyacrylic acid or its salt as a dispersion agent in the amount of 100 to 1000% by weight with respect to the pigment. In the intercalation compound of the hydrotalcite group, excessive addition of ions having the same polarity of the ions of a dye or the like, then a repulsive force is generated by surface charge in the intercalation compound in a composite state, and agglutination between the intercalation compound particles is prevented. It is considered that when the aforementioned compound is added as a dispersion agent, dispersability of the intercalation compound is stabilized. It should be noted that a sufficient dispersion effect cannot be obtained if the amount of polyacrylic acid or its salt to be added is below 100% by weight, whereas if the amount to be added exceeds 1000% by weight, an image formed by this pigment ink is readily destroyed in water, i.e., water resistance of the image is deteriorated.

As for the humectant, it is preferable to simultaneously use heterocyclic ketone and glycerine or its derivative. Each of the heterocyclic ketone and glycerine or its derivative has humidity-retaining characteristic. However, heterocyclic ketone has solubility with respect to a dye to be adsorbed between layers of the intercalation compound, whereas glycerine or glycerine derivative has no solubility with respect to a dye. Consequently, if a heterocyclic ketone alone is used as a humectant, it swells by absorbing the dye, and an image formed shows remarkable blotting. Alternatively, if glycerine or glycerine derivative alone is used as a humectant, the ink cannot come out of a printer smoothly, and an image formed becomes blurred. Finally, clogging occurs. Therefore, heterocyclic ketone and glycerine or glycerine derivative should be used in combination in appropriate amounts.

The heterocyclic ketone may be pyrrolidone, propylene carbonate, g-butyrolactone, 1, 3-dimethyl-2-imidazolinone, or the like.

The pigment ink according to the present invention may contain an aqueous organic solvent. It is preferable that the aqueous organic solvent be at least one of aliphatic monohydric alcohol, polyhydric alcohol, and derivative of polyhydric alcohol.

The aliphatic monohydric alcohol has an excellent penetration into a paper on which a record is to be formed, and has an effect to promote evaporation. The aliphatic monohydric alcohol is preferably ethyl alcohol, isopropyl alcohol, n-butyl alcohol or the like which can easily be used. Especially, isopropyl alcohol has an appropriate drying ability without any odor, and can improve dot formation. The least amount of this aliphatic alcohol to be contained in the pigment ink is 1% by weight with respect to the entire pigment ink amount, and the upper limit is about 30% by weight, considering the surface tension of the pigment ink and solubility of the dye. It is preferable that the amount to be contained be 1% to 20% by weight.

The polyhydric alcohol and the derivative of polyhydric alcohol are solvents having a high boiling point, absorb humidity, preventing nozzle clogging, and have an effect to improve storage condition of the pigment ink. Moreover, among polyhydric alcohol, diethylene glycol and glycerin can be used excellent solvents of a dye. Besides, these materials lower the freezing point of the water which is the main content of the pigment ink. The least content of the polyhydric alcohol and the derivative of polyhydric alcohol is 1% by weight with respect to the entire pigment ink amount. The upper limit is about 40% by weight, considering the viscosity and driability of the pigment ink. It is more preferable that the amount be 5% to 30% by weight.

The pigment ink may further contain at least one of a surface-active agent, a viscosity controlling agent, an antifoamer, an antiseptic, and a pH controlling agent.

The surface active agent controls the surface tension of the pigment ink and improves storage condition of the pigment ink. The surface active agent may be an anionic surface active agent such as alkyl sulfuric esters or a nonionic surface active agent such as polyoxyethylene alkyl ethers and polyoxyethylene aliphatic esters, at least one of which should be used for the purpose. The amount of the surface active agent to be contained varies depending on the type of the surface active agent. However, it is preferable that the amount be 0.01 to 5% by weight with respect to the entire pigment ink amount.

The viscosity controlling agent improves the releasability and discharge condition of the pigment ink from a printer. It is possible to employ any of the generally available viscosity controlling agents.

The antifoamer is added to suppress generation of pneumatocysts which affect stability of ink come-out and, in the worst case, may stop the ink come-out itself. Any of the antifoamers can be used.

The antiseptic improves storage condition of the pigment ink by preventing decomposition of the pigment ink and generation of mildew. Any of the art-recognized antiseptics can be used.

The pH controlling agent eliminates changes of pH of the pigment ink by a material which is brought into contact with the pigment ink, thus protecting a recording device used and increasing the storage condition of the pigment ink itself. Any of the available art-recognized pH controlling agents can be used. It is preferable that the amount of the pH controlling agent be added so as to obtain a pigment ink having pH of 7.0 to 11.0, more preferably, pH 7.5 to 9.0, i.e., slightly alkali.

When forming an image by using the pigment ink according to the present invention, it is possible, for example, to use a standard ink jet recording device provided with a bubble drive jet nozzle and a piezo element drive jet nozzle so as to selectively let the pigment ink come onto a recording material according to an image signal.

The pigment ink according to the present invention having the configuration has thus far been described does not need to select a recording material because no dye receiving layer is required on the side of the recording material.

Consequently, any of the recording paper can be used: for example, paper such as standard paper and synthetic paper, or plastic films such as polyethylene terephthalate as well as paper coated with plastics.

As has thus far been described, the pigment ink according to the present invention uses a pigment in which dye ions are steadily fixed between layers of an intercalation compound based on ion replacement, and consequently, enables an image having an excellent storage condition, fixation, and service life with coloring which can be compared to a dye ink. It is also possible to assure the chroma and resolution of the image.

EXAMPLES

Description will now be directed to preferable examples according to test results.

Test 1

Pigments were prepared by using minerals of montmorillonite group having a smectic structure (hereinafter, referred to smectites) as intercalation compounds, and samples of ink were prepared by using the pigments obtained.

Preparation of Ink Samples
 Ink Sample A
 Firstly, a liquid mixture was prepared as follows.
 Test Liquid Composition
  Ethanol . . . 1000 weight parts
  Pure water . . . 700 weight parts
  Hydrochloric acid of 1 mol/l . . . 100 weight parts Then, 100 weight parts of smectite (trade name: LABONITE RDS produced by Laporte Co., Ltd.) were added into the liquid while agitating the liquid, and the obtained liquid with smectite was agitated for 20 hours at the room temperature so as to substitute interstitial ions in the smectite with hydrogen ions.

Next, 10 weight parts of phthalocyanine-basic Direct dye (trade name: J-AG produced by Nippon Kayaku Co., Ltd.) was added, and immediately, a blue dye was precipitated. This dye was not decolorized even after washing by water was repeated.

After this, the pigment thus obtained and dispersed in water was dehydrated by a filter press processing, subjected to vacuum drying, and crushed into particles having an average particle diameter of 100 mm. This powder will be referred to as a Pigment Sample "a".

The Pigment Sample a thus obtained was put into an aqueous solution as follows and subjected to an ultrasonic wave of 1 kW output for 200 hours.
 Aqueous Solution Composition
  Pigment Sample "a" . . . 1 weight part
  Nonionic surface active agent (trade name: NP-7.5 produced by Nikko Chemicals Co., Ltd.) . . . 1 weight part
  Isopropanol . . . 1 weight part
  Pure water . . . 7 weight parts Subsequently, the aqueous solution was filtered through a membrane filter (of pore diameter 0.8 mm). As a result, the Pigment Sample a had an average particle diameter of 0.08 mm.

The solution in which this Pigment Sample a was dispersed was diluted by three times by pure water so as to obtain an ink. This ink will be referred to as Ink Sample "A".
 Ink Sample B
 A pigment was prepared in the same way as the Ink Sample A except for that the hydrochloric acid had been excluded from the solution. The pigment thus obtained will be referred to as Pigment Sample "b".

By using this Pigment Sample b, an ink was prepared in the same way as the Ink Sample A. This ink will be referred to as Ink Sample B.

It should be noted that in preparation of this Ink Sample B, no precipation occurred when the dye was added. That is, adsorption of the dye ions is insufficient if the interstitial ions of the smectite is not substituted by hydrogen ions in advance.

Evaluation of Properties

The ink samples obtained in the aforementioned manner were used for printing so as to obtain printing record samples, which were then tested for their print concentration, light resistance, and weather resistance as follows.

Each of the ink samples obtained in the aforementioned manner was put into a cartridge of a printer (model name: 1200C) produced by Hewlitt-Packard, and printing was carried out onto a recycled sheet of paper so as to obtain an image.

Firstly, for checking the concentration of each print sample, chromaphoric concentration (reflection) was determined as cyan. Moreover, a transparency concentration was measured when similar recording was made onto an OHP sheet (trade name: C3835A) produced by Hewlitt-Packard.

Next, each of the print samples was placed in water for 10 minutes so as to determine water resistance. Moreover each of the print samples was subjected to radiation of 600 kJ/m$^2$ energy equivalent to the 6th class of the third exposure method of JIS (Japan Industry Standard) L0841 by using a xenon light source so as to determine a concentration residue ratio for evaluating light resistance. Furthermore, each of the print samples was left for 2 weeks in a dark place under a condition of 60° C. temperature and with a relative humidity of 85%, so as to determine a concentration residue ratio for evaluating the weather resistance.

As a result, the print sample obtained by using the Ink Sample A exhibited a chromophoric concentration of 0.9 and a transparency concentration of 1.2. Moreover, the print sample did not blot even after being dipped in water, and the image was perfectly retained. That is, a preferable water resistance was obtained. Furthermore, preferable results were also obtained in the tests of the light resistance and weather resistance. Almost no deterioration occurred in concentration.

On the other hand, the print sample formed by using the Ink Sample B exhibited a tranparency concentration of 2.2. However, the image ran out almost perfectly after dipping in water. Moreover, this print sample showed inferior light resistance. That is, the concentration was significantly decreased by radiation of the energy equivalent to the aforementioned 6th class of the third exposure method of JIS L0840, and the concentration was enough to be retained by energy radiation equivalent to the 5th class of the third exposure method of JIS L0841. Furthermore, this print sample showed an inferior weather resistance. After the sample was stored in the aforementioned dark place, the image blotted in such a manner that almost no dots remained.

As has been seen from the above-described results, it is clear that the ink using a pigment in which dye ion adsorption is sufficient owing to substitution of interstitial ions of the smectite with hydrogen ions exhibits an excellent fixation property, and the image formed by using this ink is excellent in print concentration, water resistance, and light resistance, as well as weather resistance.

Test 2

Test 2 checked a substitution amount of dye ions with respect to an replacement capacity of smectite.

Preparation of Ink Samples
Ink Sample C
Firstly, a test liquid as follows was prepared.
Test Liquid Composition
Ethanol . . . 1000 weight parts
Hydrochloric acid of 1 mol/l . . . 100 weight parts 10 weight parts of smectite (trade name: SWN produced by Cope Chemicals) which had been treated by tetradecylammonium so as to enlarge a spacing was added to the aforementioned test liquid while agitating the liquid. Next, 0.5 weight part of lauryl sulfide of C. I. Basic Red was added as a dye, and immediately a red pigment was precipitated. This pigment will be referred to as a pigment sample "c", It should be noted that this pigment sample c was not discolored even after repeating washing by ethanol.

Subsequently, the pigment sample c thus obtained was dried and crushed into a powder having an average particle diameter of 65 $\mu$m in the same way as the pigment sample a.

The pigment sample c in a powder state obtained in the aforementioned manner was put into a solution as follows and subjected to radiation of an ultrasonic wave of 1 kW output.

Aqueous Solution Composition
Pigment sample "c" . . . 1 weight part
Nonionic surface-active agent (trade name: NP-7.5 produced by Nikko Chemicals Co., Ltd.) . . . 1 weight part
Diethylene glycol . . . 3 weight parts
Pure water . . . 10 weight parts Next, the solution was filtrated through a membrane filter (pore diameter: 0.4 $\mu$m). Then, the pigment had an average particle diameter of 0.11 $\mu$m. It should be noted that this dispersion liquid was in a paste state having a viscosity of 500 cps or above.

To cope with this, 0.5 weight part of pyrophosphoric soda was added to this dispersion liquid and agitated. The viscosity was immediately reduced to an order of 10 cps. This property almost did not change after the liquid was left for three days at a room temperature. This dispersion liquid of the pigment sample c will be referred to as an Ink sample C.

Ink Sample D

A pigment powder was obtained in the same way as the pigment sample "c" except for that 5 weight parts of lauryl sulfide of C. I. Basic Red (10 times more than in the case of the pigment sample c) was added as a dye. The pigment thus obtained will be referred to as a pigment sample d.

This pigment sample "d" was added to the same aqueous solution used in preparing the Ink sample C, and was subjected to an ultrasonic wave of 1 kW output for 100 hours, which is equal to 10 times of the case when preparing the ink sample C.

However, it was found that the pigment sample d had a particle diameter not reaching even 1 $\mu$m. When the composition ratio of the dye with respect to the smectite is too large, the dispersion property in water is significantly deteriorated.

When 0.5 weight part of pyrophosphoric soda liquid is added to this dispersion liquid, the viscosity was reduced. The dispersion liquid of the pigment sample d thus obtained will be referred to as an Ink sample D.

Evaluation of Properties

The ink samples obtained in the aforementioned manners were used to form images for checking the concentration and water resistance of the obtained images.

The check was carried out as follows. Each of the ink samples was impregnated into a plastic foam and mounted on a stamp base available in market. Then, printing was carried out onto a standard paper (recycled paper) to form an image. The reflection optical concentration of this image was determined. Moreover, for checking the water resistance, an image after being formed was left for one hour. Then, an applicator containing water was slid along the image so as to observe the image retaining condition.

It was found that the image formed by using the ink sample C had a reflection optical concentration of 0.8 which is considered to be practical, and almost did not change after the applicator containing water was slid over. That is, the image had an excellent water resistance.

On the other hand, the ink sample D had a problem that particles were precipitated and agglutinated in the plastic foam. That is, the ink sample D turned out to be not practical as a stamp ink.

As has been seen in this test, when the dye ion substitution amount with respect to the replacement capacity of the smectite is selected to be a proper value, an ink having an excellent fixation property can be obtained, improving the concentration and water resistance of an image formed by using this ink.

Moreover, various types of ink were prepared by varying the dye ion substitution amount with respect to the replacement capacity of the smectite. It was found that when the dye ion substitution amount with respect to the replacement capacity is below 5%, coloring efficiency is insufficient; and when the substitution amount is 100% or above, there are left some dye which cannot adsorb between layers of the smectite and covers the smectite particle surface, which deteriorates the fixation efficiency. Furthermore, when a difference between the interstitial ion size and the dye ion size is taken into consideration, the dye ions substituted by interstitial ions is considered to be about 50% of the replacement capacity at the most due to intercalation. Consequently, it is preferable that the dye ion substitution amount with respect to the replacement capacity be 5% to 50%.

This test also showed the effect obtained by adding a dispersion agent into the ink. That is, as has been explained in the processing step of the ink sample C, addition of pyrophosphoric soda can lower the viscosity of the pigment dispersion liquid. Moreover, the amount of the pyrophosphoric soda was varied to check the dispersion effect, and it was found that if the addition of the pyrophosphoric soda is below 20% by weight with respect to the pigment, the effect to lower the viscosity of the pigment dispersion liquid is insufficient, but when the value is 20% by weight or above, this effect can be retained until the solution limit is reached.

Thus, it was found that an ink having an excellent dispersion property can be obtained by adding 20% to 100% by weight of pyrophosphoric acid or its salt to a pigment in which dye ions are adsorbed between layers of the smectite.

Test 3

In this test, minerals of the hydrotalcite group (hereinafter, referred to as hydrotalcite) was used as an intercalation compound to prepare a pigment and, by using this pigment, various types of ink were prepared for evaluation of various properties.

Preparation of Ink Samples
Ink Sample E
Firstly, a mixture liquid as follows was prepared.
Test Liquid Composition
Pure water . . . 10 weight parts
Diethylene glycol . . . 10 weight parts
2-pyrolidone . . . 15 weight parts Next, 10 weight parts of hydrotalcite (trade name: KW2200 produced by Kyowa Kagaku Kogyou Co., Ltd.)

was added into this test liquid while agitating the liquid by using a spatula until the liquid becomes paste. Then, the mixture was put into a three-roll mill and kneaded for 156 hours by controlling the roller temperature at 40° C. As a result, the hydrotalcite particle diameter became about 0.1 µm.

Subsequently, 10 weight parts of C. I. Direct Yellow 132 (trade name: IG produced by Zeneca Co., Ltd.) was added to the aforementioned paste, and the paste was kneaded 24 hours more. This produced a paste of yellow color pigment having a particle diameter increased by about 10%. This will be referred to as a pigment sample "e".

The paste of the pigment sample e thus obtained was then added by 30 weight parts of hydroxypropyl cellulose (trade name: HPC-L produced by Nippon Sotatsu co., Ltd.), 10 weight parts of pure water, and 10 weight parts of ethanol, and agitated for one hour so as to obtain a dispersion liquid of the pigment sample e. This will be referred to as an Ink sample E.

Ink Sample F

A pigment was obtained in the same way as in the preparation procedure of Ink sample E except for that the hydrotalcite used was an non-calcinated one having a composition formula: $Mg_{4.5}Al_2(OH)_{13}CO_3 \cdot 3.5H_2O$ (trade name: KW1000 produced by Kyowa Kagaku Kogyo Co., Ltd.). This pigment will be referred to as an pigment sample "f". Next, a dispersion liquid of the pigment sample f was prepared in the same way as the preparation procedure of the Ink sample E. This dispersion liquid will be referred to as an Ink sample F.

Ink Sample G

The hydrotalcite used was a calcinated one (trade name: KW2200 produced by Kyowa Kagaku Kogyo Co., Ltd.), which was swollen in water and added by salicylic acid (pKa=2.81) in an amount equivalent to the replacement capacity of this hydrotalcite (6.7 mm mol/g). This was left for two days as it is so as to reach equilibrium. Then, a powder is recovered and dried for use in the test. A pigment was prepared in the same way as the pigment sample e except for using the above-described hydrotalcite. This pigment will be referred to as pigment sample g. Next, a dispersion liquid of the pigment sample g was prepared in the same way as the preparation procedure of the Ink sample E. This will be referred to as an Ink sample G.

Ink Sample H

A pigment was prepared in the same way as the pigment sample g except for that calcinated hydrotalcite (trade name: KW2200 produced by Kyowa Kagaku Kogyo co., Ltd.) was treated by using acrylic acid (pKa=4.26) instead of salicylic acid. This pigment will be referred to as Pigment sample "h". A dispersion liquid of the pigment sample h was prepared in the same way as the processing procedure of the Ink sample E so as to obtain an Ink sample H.

Ink Sample I

A pigment was prepared in the same way as the pigment sample g except for that calcinated hydrotalcite (trade name: KW2200 produced by Kyowa Kagaku Kogyo Co., Ltd.) was treated by malic acid (pKa=3.24) instead of salicylic acid. Thus, Pigment sample "i" was obtained. Next, a dispersion liquid of the pigment sample i was prepared in the same way as the preparation procedure of the ink sample E. This will be referred to as Ink sample I.

Ink Sample J

A pigment was prepared in the same way as the pigment sample "e" except for that the hydrotalcite used was one which had been treated by dicarbonic acid (trade name: DHT-4C produced by Kyowa Kagaku Kogyo Co., Ltd.). Thus, a pigment sample "j" was obtained. Next, a dispersion liquid of the pigment sample j was prepared. This will be referred to as an Ink sample J.

Evaluation of Properties

The ink samples obtained in the aforementioned manner were used to form images for checking concentration, light resistance and others.

Firstly, each of the ink samples was painted on a polyethylene terephtalate film by using a wire bar and dried by using a hot blast drier. Thus, an image was formed of a yellow film having a thickness of 1 µm.

Each of the images obtained by the respective ink samples was immersed in water so as to dissolve out dye not fixed. Then, the optical concentration (transparency) was determined. Moreover, by using a xenon light source, an energy equivalent to the 5th class of the third exposure method of JIS L0841 was radiated so as to determine a concentration residue ratio for evaluating the light resistance. Furthermore, each of the images was stored for three days under conditions of 65° C. temperature and 86%. relative humidity. A chrominance between the colors prior to and after this storage was determined for evaluating discoloration. The chrominance was checked by using a spectroscope (model name: SPM100-11) produced by Greatag Co., Ltd. so as to determine L*, a*, and b* before and after the storage for calculation of an equation as follows.

$$\text{Chrominance} = [(\Delta L^*)2 + (\Delta a^*)2 + (\Delta b^*)2]^{1/2} \quad (1)$$

The results of the test for each of the ink samples are shown in Table 1 below together with the dye adsorption amount of hydrotalcite.

TABLE 1

| | Dye adsorption amount | Discoloration | Optical Concentration | Light Resistance |
| --- | --- | --- | --- | --- |
| Ink Sample E | 0.2 | 60 | 0.6 | 11 |
| Ink Sample F | 0.08 | 20 | 0.5 | 2 |
| Ink Sample G | 0.3 | 3 | 1.6 | 98 |
| Ink Sample H | 0.6 or above | 18 | 1.8 | 46 |
| Ink Sample I | 0.03 | 18 | 1.0 | 35 |
| Ink Sample J | 0.001 | 38 | 0.2 | 0 |

As shown in Table 1, the samples using calcinated hydrotalcite can be clearly compared to the samples using non-calcinated hydrotalcite. When calcinated hydrotalcite is used, adsorption is increased. Consequently, the optical concentration is increased and the concentration residue ratio after energy radiation is also increased.

Moreover, when the interstitial ions of the calcinated hydrotalcite are substituted by salcylic acid anions, the dye adsorption amount is increased. Accordingly, the optical concentration is also increased and the concentration residue ratio after energy ratio is also increased. Furthermore, the chrominance after the storage and the discoloration are suppressed to the minimum. It should be noted that such effects cannot be obtained sufficiently when substitution of the interstitial ions is carried out by using malic acid and dicarbonic acid as an organic acid. When acrylic acid is used, the dye adsorption amount is increased and the optical concentration is improved, but the resultant ink has a high viscosity and not preferable as an ink.

Judging from the aforementioned results, it can be said that hydrotalcite calcinated is more preferable than hydrotalcite non-calcinated. Moreover, it is preferable that the interstitial ions be substituted by salicylic acid anions. Such hydrotalcite is capable of carrying out dye ion adsorption sufficiently, and consequently, when this is used as a pigment of an ink, the ink shows an excellent fixation property, and an image formed by this ink exhibits excellent concentration, water resistance, light resistance, and weather resistance.

Test 4

This test checks effects obtained by addition of an dispersion agent and a wetting agent to the ink formed by a pigment using hydrotalcite.

Preparation of Ink Samples

Ink Sample K

Firstly, a test liquid was prepared as follows.

Test Liquid Composition

Pure water . . . 100 weight parts

Isopropanol . . . 25 weight parts

This test liquid was added by hydrotalcite which had been treated by the salicylic acid similar to the one used for the Ink sample G. Then, by using a sand mill, the hydrotalcyte was crushed until the particle diameter became about 0.2 $\mu$m.

Subsequently, this hydrotalcite-dispersed liquid was added by the following dyes: 2 weight parts of C. I. Direct Yellow 132; 2 weight parts of C. I, Acid Red 273; and 0.5 weight part of C. I. Direct Blue 199. Immediately, yellow, red-violet, and blue-green precipitation occurred and a liquid with a high viscosity was obtained. These three colors of pigment will be referred to as a pigment sample "k".

The dispersion liquid of the pigment sample k was added 0.5 weight part of polyacrylic soda (trade name: A20U produced by Toa Gosei Co., Ltd.) and agitated. Immediately, the liquid viscosity was reduced to the order of 10 cps and this property almost did not change after being stored at a room temperature for three weeks.

Next, the dispersion liquid was added by 25 weight parts of a mixture of glycerin and 2-pyrolidone at a ratio of 1:1, subjected to radiation of an ultrasonic wave of 1 kW output, and filtrated through a membrane filter (with pore diameter of 0.4 $\mu$m). As a result, the pigment sample k had an average particle diameter of 0.3 $\mu$m or below. The three pigment samples k thus obtained were made into three dispersion liquids corresponding to three primary colors, which will be referred to as a set of Ink sample K.

Ink Sample L

A dispersion liquid of the pigment sample k was prepared in the same way as the preparation procedure of the aforementioned Ink sample K except for that no polyacrylic soda was added. The inks of three primary colors thus obtained will be referred to as an Ink sample L.

Because no polyacrylic soda was added when preparing this ink sample L, no breakup effect could be obtained and the viscosity remained high.

Ink Sample M

A dispersion liquid of the pigment sample k was prepared in the same way as the preparation procedure of the aforementioned Ink sample K except for that one of the wetting agents, 2-pyrolidone, was not added. The set of three primary colors of pigment ink thus obtained will be referred to as Ink sample M.

Ink Sample N

A dispersion liquid of the pigment sample k was prepared in the same way as the preparation procedure of the aforementioned Ink sample K except for that one of the wetting agents, glycerin, was not added. The set of three primary colors of pigment ink thus obtained will be referred to as Ink sample N Ink Sample O The C. I. Direct Yellow 132, C. I. Acid Red 273, and C. I. Direct Blue 199 which substituted the interstitial ions of hydrotalcite in the aforementioned pigment sample k were directly dissolved in water together with the aforementioned dispersion agent and the wetting agent, without being introduced between layers of the hydrotalcite. Thus, three primary colors of dye ink were prepared. This set will be referred to as Ink sample O.

Evaluation of Properties

Each of the ink samples obtained in the above-described manner was used for forming an image, and images obtained were evaluated as follows.

Firstly, a standard ink of a printer produced by Epson (trade name: 500C) was replaced by each of the aforementioned ink samples for forming an image on a recycled paper. Each of the obtained images was observed whether blot occurred. Moreover a reflection concentration was determined for each of the images.

As a result, Ink sample K was preferably came out of the printer and the image formed had high quality without blotting.

On the other hand, the ink sample L which had not been added by the polyacrylic soda could not smoothly come out of the printer because of its high viscosity. This means that when preparing an ink by using a pigment in which hydrotalcite interstitial ions are substituted by dye ions, it is effective to add polyacrylic soda as a dispersion agent.

The effect obtained by addition of polyacrylic soda was checked by varying the amount to be added. When the amount is 20% by weight or above, breakup effect can be obtained sufficiently. It was found that this effect can be maintained until solution limit of polyacrylic soda is reached. However, when the amount of polyacrylic soda added is 20% by weight or above, the image which has been formed by using this ink is easily destroyed in water, i.e., water resistance is significantly deteriorated. It is preferable that 2 to 20% by weight of polyacrylic soda be added with respect to the ink.

When the Ink sample K is compared to Ink sample M to which no glycerin has been added, the Ink sample K smoothly comes out of the printer whereas the ink sample M cannot come out of the printer smoothly and the image obtained is blurred. The ink exit slit of the printer is clogged if such image recording is continued as it is. Moreover, the effect obtained by glycerin was also checked by varying the amount of glycerin added. It was found that when the glycerin amount is 10% by weight or above with respect to the pigment, preferable ink out-come can be obtained.

Moreover, when the ink sample K is compared to the ink sample N to which 2-pyrolidone has been added, blotting occurs only in the image formed by Ink sample N. The effect of 2-pyrolidone was checked by varying the amount added to the ink, and it was found that when the amount of 2-pyrolidone with respect to the pigment is 100% by weight or above, blotting also occurs in the image formed by this ink.

Judging from these results, it is clear that when an ink is made from a pigment in which hydrotalcite interstitial ions are substituted by dye ions, it is effective to add both glycerin and 2-pyrolidone as wetting agents. It should be noted that glycerin and its derivatives have no dissolving effect with respect to a dye whereas heterocyclic ketone such as 2-pyrolidone has dissolving effect with respect to a dye. When these different properties are used in combination, it becomes possible to obtain both effects: smooth come-out of a printer and prevention of blotting.

Next, when the ink sample K which is a pigment ink is compared to the ink sample O which is a dye ink, it is found that an image formed by Ink sample K has a high quality with a reflection concentration exceeding 1.0, whereas an image formed by using Ink sample O shows a reflection concentration of about 0.8 and caused remarkable blotting. Thus, it is clear that it is possible to obtain an image of high quality when the image is formed by an ink using a pigment in which intercalation compound interstitial ions are substituted by dye ions according to the present invention instead of using a dye directly as an ink.

As has been shown above, according to the present invention, there is no need of forming a dye-receiving layer on a material to be recorded. Consequently, coloring as good as a dye ink can be obtained without selecting the type of material to be recorded. Moreover, the present invention provides a simplified process of production, which enables to reduce production costs compared to a case when using a conventional pigment.

Furthermore, an image formed by using the pigment ink according to the present invention exhibits chroma, resolution, and resistance as good as silver salt photography, and the image can be used as an official photograph or a poster for outdoor use. That is, this pigment ink has a high industrial value.

What is claimed is:

1. A pigment comprising:
    an anion exchangeable intercalation compound having a layered structure with ion exchangeable interstitial ions and an associated interstitial ion exchange capacity, said anion exchangeable intercalation compound having an interstitial ion exchangeable ions substituted with an anion selected from the group consisting of anions of salicylic acid, anions of isomers of salicylic acid and anions of derivatives of salicylic acid having a pKa value of about 5.0 or below and having from about 5 to about 50% of the interstitial ion exchange capacity of the anion exchangeable intercalation compound having interstitial ion exchangeable ions substituted with a dye ion selected from the group consisting of direct dye ions and acidic dye ions,
    wherein said anion ion exchangeable intercalation compound comprises a mineral of the hydrotalcite group.

2. A pigment as claimed in claim 1, wherein said mineral of the hydrotalcite group is a natural clay which has a composition of $Mg_{0.7}Al_{0.3}O_{1.16}$ and has been calcinated.

3. A pigment as defined in claim 1, wherein said anion exchangeable intercalation compound further includes interstitial ion exchangeable ions substituted with onium ions.

4. A pigment ink composition comprising:
    water;
    a monohydric or polyhydric alcohol;
    a polyacrylic acid or acid salt; and
    a pigment comprising an anion exchangeable intercalation compound having a layered structure with ion exchangeable interstitial ions and an associated interstitial ion exchange capacity, said anion exchangeable intercalation compound having interstitial ion exchangeable ions substituted with an anion selected from the group consisting of anions of salicylic acid, anions of isomers of salicylic acid and anions of derivatives of salicylic acid having a pKa value of about 5.0 or below and having from about 5 to about 50% of the interstitial ion exchange capacity of the anion exchangeable intercalation compound having interstitial ion exchangeable ions substituted with a dye ion selected from the group consisting of direct dye ions and acidic dye ions,
    wherein said anion ion exchangeable intercalation compound comprises a mineral of the hydrotalcite group.

5. A pigment ink as claimed in claim 4, wherein said mineral of the hydrotalcite group is a natural clay which has a composition of $Mg_{0.7}Al_{0.3}O_{1.16}$ and has been calcinated.

6. A pigment ink composition as defined in claim 4, further comprising a wetting agent comprising a mixture of (a) a heterocyclic ketone and (b) glycerin or a derivative of glycerine.

7. A pigment ink composition as defined in claim 6, wherein the heterocyclic ketone is pyrolidone.

8. A pigment ink composition as defined in claim 4, further comprising a surfactant.

* * * * *